United States Patent [19]

Mandy

[11] Patent Number: 5,408,394
[45] Date of Patent: Apr. 18, 1995

[54] DOWN LIGHTING SYSTEMS AND FIXTURES THEREOF

[75] Inventor: Robert R. Mandy, Bingham Farms, Mich.

[73] Assignee: Man-D-Tec, Inc., Scottsdale, Ariz.

[21] Appl. No.: 940,672

[22] Filed: Sep. 4, 1992

Related U.S. Application Data

[63] Continuation-in-part of Ser. No. 672,415, Mar. 20, 1991, Pat. No. 5,145,247, which is a continuation-in-part of Ser. No. 448,222, Dec. 11, 1989, Pat. No. 5,003,432, which is a continuation of Ser. No. 191,423, May 9, 1988, Pat. No. 4,890,200.

[51] Int. Cl.$^6$ ............................................. F21S 1/02
[52] U.S. Cl. ............................................. 362/148; 362/20; 362/76; 362/366; 362/396; 248/343; 439/470
[58] Field of Search ................... 362/20, 76, 145, 147, 362/148, 150, 183, 184, 249, 250, 251, 254, 276, 364, 365, 366, 396, 802, 258, 362; 248/27.1, 342, 343, 344; 174/65 R; 439/449, 470

[56] References Cited

U.S. PATENT DOCUMENTS

| | | | |
|---|---|---|---|
| 2,193,820 | 3/1940 | Knight | 362/396 |
| 2,835,791 | 5/1958 | Horwitz | 240/78 |
| 3,189,788 | 6/1965 | Cady | 315/129 |
| 3,229,027 | 1/1966 | Kindorf | 174/65 R |
| 3,336,473 | 8/1967 | Buzan | 240/37.1 |
| 3,358,133 | 12/1967 | Thoman et al. | 362/362 |
| 3,670,094 | 6/1972 | Mattson | 174/65 R |
| 3,739,226 | 6/1973 | Seiter et al. | 362/20 |
| 3,748,462 | 7/1973 | Newman | 362/362 |
| 3,808,499 | 4/1974 | Edwards | 315/86 |
| 4,071,749 | 1/1978 | Balogh | 362/20 |
| 4,156,891 | 5/1979 | Roche | 362/20 |
| 4,218,725 | 8/1980 | Heffner et al. | 362/183 |
| 4,223,232 | 9/1980 | Bulat | 307/66 |
| 4,271,621 | 6/1981 | Garcia et al. | 362/183 |
| 4,441,143 | 4/1984 | Richardson, Jr. | 362/183 |
| 4,459,429 | 7/1984 | Docimo | 174/65 R |
| 4,459,648 | 7/1984 | Ullman | 362/396 |
| 4,475,147 | 10/1984 | Kristofek | 362/148 |
| 4,504,894 | 3/1985 | Reibling | 362/296 |
| 4,520,436 | 5/1985 | McNair et al. | 362/366 |
| 4,587,597 | 5/1986 | Meyers | 362/20 |
| 4,682,078 | 7/1987 | Pascilade | 315/86 |
| 4,727,291 | 2/1988 | Bavaro | 315/86 |
| 4,749,908 | 6/1988 | Stiffer | 362/183 |
| 4,754,377 | 6/1988 | Wenman | 362/148 |
| 4,802,065 | 1/1989 | Minter et al. | 362/20 |
| 4,890,200 | 12/1989 | Mandy | 362/20 |
| 4,894,601 | 1/1990 | Watkins | 362/276 |
| 5,003,432 | 3/1991 | Mandy | 362/20 |
| 5,025,349 | 6/1991 | Gow | 362/20 |
| 5,031,084 | 7/1991 | Russo et al. | 362/148 |
| 5,075,831 | 12/1991 | Stringer et al. | 362/147 |
| 5,145,247 | 9/1992 | Mandy | 362/148 |
| 5,178,446 | 1/1993 | Gruber et al. | 362/802 |
| 5,183,330 | 2/1993 | Rishel et al. | 362/295 |

FOREIGN PATENT DOCUMENTS

| | | | |
|---|---|---|---|
| 0230619 | 9/1960 | Australia | 362/364 |
| 0620817 | 5/1961 | Italy | 362/396 |

Primary Examiner—Ira S. Lazarus
Assistant Examiner—Alan B. Cariaso
Attorney, Agent, or Firm—Reising, Ethington, Barnard, Perry & Milton

[57] ABSTRACT

A down lighting system for elevator cabs and the like includes halogen lights in standard and emergency light fixtures. Both types of fixtures are connected to the ceiling by a clamp arrangement which is universally adaptable to a wide variety of ceiling types without changing the light housing dimensions. The clamp arrangement fastens light housings against rotation with respect to the ceiling and it is adjustable to different height ceiling configurations merely by connection to different vertical positions of the outer surface of the fixture. The standard fixture includes a halogen bulb with its own reflector. The emergency lighting fixture includes a halogen bulb/reflector unit with the emergency self focusing bulbs concentrically spaced around it. Both light sources pass focused light directly into the space below the ceiling for meeting test point candle power requirements. The emergency lighting circuit includes a switching relay with a manually operated button for testing the emergency light source by pulling the button to override a relay armature.

29 Claims, 7 Drawing Sheets

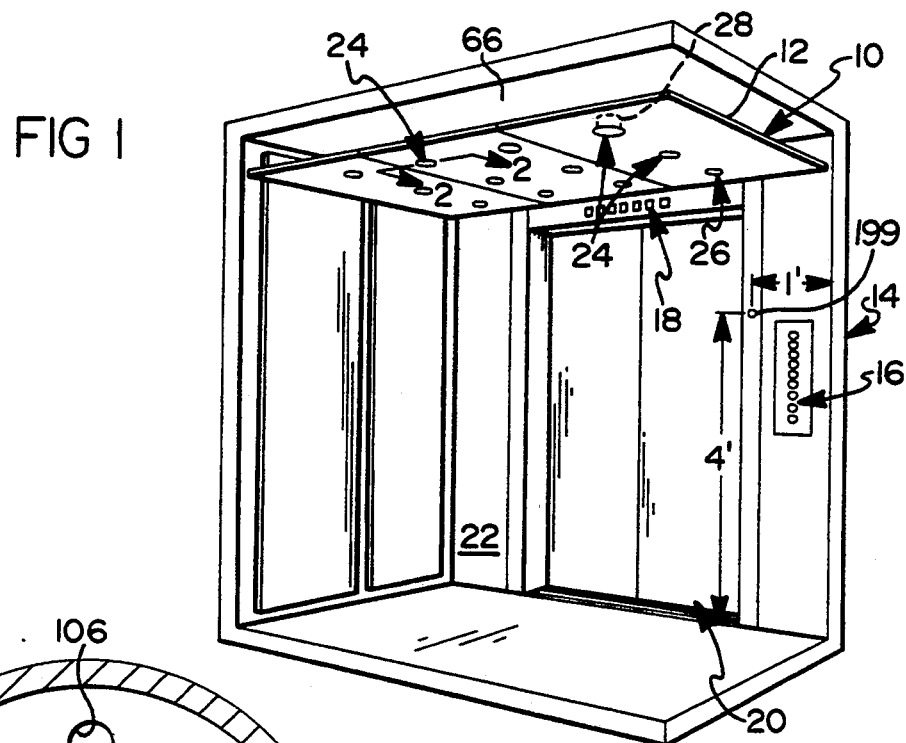
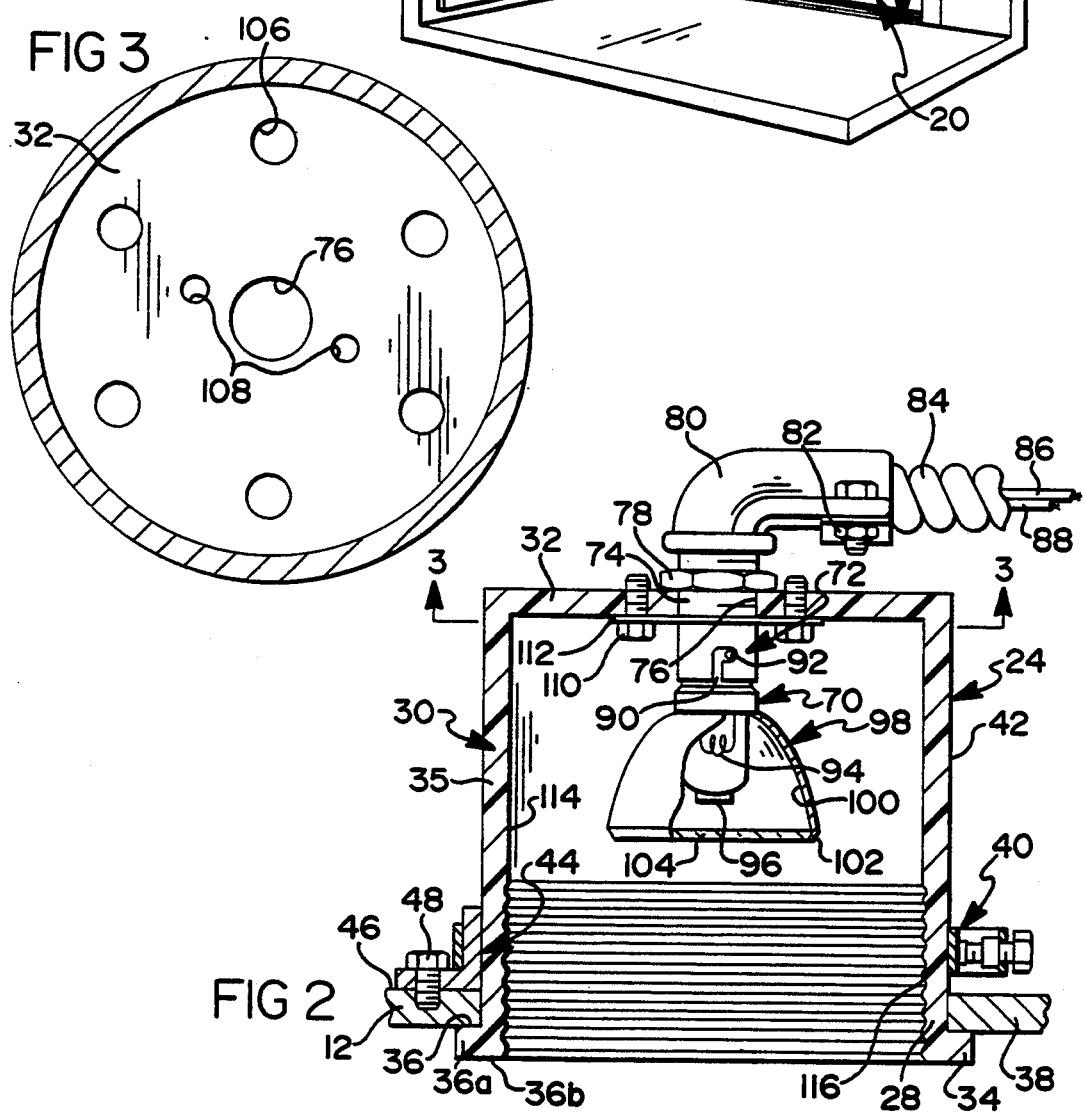

DOWN LIGHTING SYSTEMS AND FIXTURES THEREOF

This is a continuation-in-part application of U.S. Ser. No. 07/672,415 filed Mar. 20, 1991, now U.S. Pat. No. 5,145,247, which is a continuation-in-part of Ser. No. 448,222, filed Dec. 11, 1989, now U.S. Pat. No. 5,003,432, issued Mar. 26, 1991, which is a continuation of Ser. No. 191,423, filed May 9, 1988, now U.S. Pat. No. 4,890,200.

BACKGROUND OF THE INVENTION

This invention relates to lighting systems and more particularly to down lighting systems including down lighting emergency lights for elevator cabs and other spaces requiring high efficiency main lighting as well as integrated emergency lighting operative on failure of a main lighting power supply.

Lighting systems for various overhead ceiling systems require that light units be connected to a power supply through various wiring networks and connection arrangements.

It is known to provide standard 110 volt residential or commercial fixtures in overhead ceilings. In some cases the bulbs are 12 volt bulbs energized from a 110 volt system via individual step down transformers connected to power the 12 volt bulbs.

It is also known to provide a plurality of 110 volt bulbs connected to a 110 volt wiring system. The bulbs are mounted either above a egg-crate type grill covering or are hidden by a cover which will diffuse light from the bulbs. In some cases these systems are lighted by means of fluorescent tube lighting.

In cases where 12 volt bulbs are used, a large numbers of fixtures and bulbs are needed to provide enough candle power to illuminate the space below the ceiling system.

Existing down lighting systems use low light output bulbs which have short life or are operated at lower than design voltage to extend the bulb life, but all of which requires a large number of fixtures and elaborate wiring systems for connecting the fixtures to a power source.

In the case of elevator down lighting systems, it is desirable to provide as much direct lighting as possible from the main illuminating lamps both to reduce the number of fixtures required for a given area of ceiling and to reduce the complexity of the wiring system for supplying power to the individual fixtures.

A further problem with known elevator down light systems is that the emergency light source for the elevator is either located in the vicinity of the elevator control panel or is located at an overhead location above the ceiling. Such arrangements require a separate fixture for the emergency lighting. Also, in some cases the emergency light is hidden and it may be necessary to "bend" the light to produce a desired "test point" illumination within the elevator cab. Such emergency lights require more wattage which, in turn, require a larger, more expensive battery and attendant charger.

Another known emergency light system uses two of the down lights normally used for cab illumination. This system is expensive because it requires a large battery pack and charger for each light. Further, one or both bulbs may be burned out when called upon for the emergency mode.

SUMMARY OF THE INVENTION

Accordingly, an object of my invention is to provide a one piece, low profile, down lighting fixture which will provide direct focused lighting within the space below an overhead ceiling and wherein the lamp fixture is readily mounted to the ceiling by a wiring system which readily fits within low clearance plenums.

Another object of my invention is to provide such a down lighting lamp fixture and a fastener system which universally adapts the fixture housing for mounting on a variety of different height and clearance ceiling configurations.

A feature of the present invention is to provide such a lamp fixture wherein the housing includes a flanged open end and a closed end. The flanged open end is adapted to cover a fixture access hole through the ceiling and it has a diameter in excess of that of said housing to permit insertion of the housing through the access hole while defining a retention surface engageable with the outer surface of the ceiling so as to provide a locking engagement between the housing at the outer surface of the ceiling.

Another feature is to provide a fixture of the type set forth in the preceding paragraph and to further provide a retainer member extending vertically from the inner surface of the ceiling immediately adjacent the ceiling access hole and in close spaced parallelism with the outer surface of the housing. A retainer clamp surrounds the outer surface of the housing when it is inserted through the access opening and including means operative to force the retainer member into locking engagement with the outer surface of the housing while directing a hoop force on the housing which is radially opposed to the force of the retainer member and wherein the hoop retention force can be imposed on the housing anywhere along its height to accommodate for different thickness ceilings.

Still another feature is to reduce the "wired" profile of such fixtures by including a low profile conduit fitting that connects wires from a flexible conduit to socket means located inboard of the housing fixture.

Another object of my invention is to provide a ceiling mount fixture for mounting an illuminating bulb on different thickness ceilings and for connection to a flexible conduit type wire system by means of a fixture housing which is universally adaptable to different thicknesses of ceiling by use of a housing including an open end and a closed end. The open end has a diameter in excess of that of the housing to permit insertion of the housing through the access hole while defining a retention surface engageable with the outer surface of the ceiling when the fixture is mounted on the ceiling and a vertically oriented surface adaptable to be engaged by hoop type connectors immediately inboard of the inner surface of the ceiling so as to allow mounting of the fixture in low clearance plenums.

Yet another object of my invention is to provide a fixture for mounting on a ceiling in which first socket means are connected inboard of the housing for receiving a main source of illumination for directing regular illumination to a space below said ceiling; and wherein second socket means are connected inboard of the housing and concentric with the first socket means and adapted to be connected to an emergency power source for directing emergency lighting from the open end of said housing so as to provide an emergency source of illumination in the space below said ceiling upon primary or main power failure.

Another feature of my invention is to provide the fixture of the preceding object wherein the first socket includes a halogen bulb, a light reflector surrounding said bulb to direct the light from said halogen bulb vertically downwardly through said housing and a safety glass cover to diffuse light from the halogen bulb while serving to prevent shards from a broken halogen bulb from escaping through the open end of the fixture.

Yet another feature of my invention is to provide such a halogen bulb mounted in the center of the fixture and to provide secondary sockets located concentrically around the halogen bulbs to receive dedicated self focusing bulbs selectively connected to an emergency power pack for directing light downwardly through space in the housing for lighting the space below the ceiling light fixture upon a main power supply failure.

Another feature of the invention is to provide a housing of the type set forth above wherein the light source is in the form of a single ended fluorescent bulb having a free end located closely adjacent the open end of the fixture to provide down lighting therefrom and an opposite end carried by a base connected to a socket on the closed end of the fixture.

In one embodiment, a light system provides emergency lighting and regular illumination. One of the regular lights and the emergency lights share a common fixture with said housing including an open end and a closed end. The open end has a diameter in excess of that of said housing to permit insertion of the housing through the access hole while defining a retention surface engageable with the outer surface of the ceiling when the fixture is mounted on the ceiling.

First socket means are connected inboard of the housing for providing a first primary source of illumination for directing regular illumination to a space below said ceiling.

Second socket means are connected inboard of the housing and concentric with said first socket means and are adapted to be connected to an emergency power source for directing emergency lighting from the open end of said housing so as to provide an emergency source of illumination in the space below said ceiling during periods when the primary light is inoperative because of power failure. While such secondary socket means are shown as concentric, other offset locations are contemplated within the scope of my invention.

The one embodiment includes emergency lighting circuit means for connecting the second socket means to a source of emergency power when the power supply for the first primary source of illumination fails.

The emergency lighting circuit means includes a battery defining a rechargeable d.c. power source for emergency power, a battery charger having input terminals connected to the primary power source and outlet terminals for supplying charging current to the battery.

A double pole, double throw relay has a first pair of contacts and a second pair of contacts. A solenoid controlled armature is operatively connected to the first and second pairs of contacts. It is energized by the primary power source and positions the first pair of contacts to supply charging current to said battery as long as the primary power source is on. When the primary source of power fails, the solenoid positions the second pair of contacts to connect the battery to the second socket means so as to energize lamp means therein to provide emergency lighting.

A manually operative test button on the armature provides the means for manually disconnecting the first pair of contacts and connecting the second pair of contacts to connect the emergency lamp means to the battery to test emergency lighting when the primary power source is operative.

The previous embodiments of the invention can include three (3) emergency bulbs having focusing lens on the ends of the bulbs to provide a low level of illumination, viz. 0.2 foot candles minimum, under emergency lighting conditions. The light level is selected to enable an occupant of the elevator to locate and operate the push alarm button and/or the emergency cab phone located in the elevator in order to call for help.

Another feature of the present invention is to supplement such emergency bulbs with a long life, low current device for illumination, e.g. a light emitting diode or L.E.D. and locating the L.E.D. behind or in a translucent "alarm" button. Thus, under conditions in which the main power fails a battery power source is connected to both the emergency bulbs and the L.E.D. to illuminate the alarm button so that there is no mistaking its location. To attract even more attention the low current device can be of the flashing or blinking type.

Another feature of the invention is to provide such a light source on the emergency cab telephone cover behind or in an indicator button located on or in the vicinity of the telephone cover. In cases where the emergency phone is replaced by a speaker phone the illumination source can be located in the button which is operated to automatically dial the phone or push it to directly talk without dialing.

Still another feature of the invention is to provide an improved system for locating and illuminating a phone box in an elevator to locate it when the main power system fails. The system is simpler and less expensive than speaker phone systems which are often used in place of standard cab phones located in an elevator since in the past standard cab phones have been vandalized or stolen. The improved system of this invention enables a standard cab phone to be located in the cab behind a selectively opened access door. The improved system includes a solenoid operated latch which is normally maintained locked when the main power is functioning. Under emergency conditions the locking latch is energized by the emergency D.C. power source to release the access door so as to expose the phone and wherein the improved system further includes an emergency light within the phone compartment that illuminates when the emergency power source is connected to draw an occupant's attention to the phone. If desired the emergency light can be of the flashing variety to provide still further attention.

Still another feature of the present invention is to provide the improved elevator cab phone lighting system of the preceding paragraph wherein the light source within the phone box is provided by locating a plurality of emergency lights in either the box or on the access door so as to concurrently aid in identifying and locating the emergency phone while providing a low level illumination of the elevator cab under emergency conditions.

Other objects, features and advantages of the present invention will be readily appreciated as they become better understood with reference to the following description when considered in conjunction with the accompanying drawings wherein:

BRIEF DESCRIPTION OF THE DRAWINGS

FIG. 1 is a perspective view showing an elevator cab including an overhead lighting system in accordance with the present invention;

FIG. 2 is an enlarged sectional view taken along the line 2—2 of FIG. 1 looking in the direction of the arrows;

FIG. 3 is a vertical sectional view taken along the line 3—3 of FIG. 2 looking in the direction of the arrows with the light bulb socket removed;

DETAILED DESCRIPTION OF THE PREFERRED EMBODIMENTS

Figure 4:
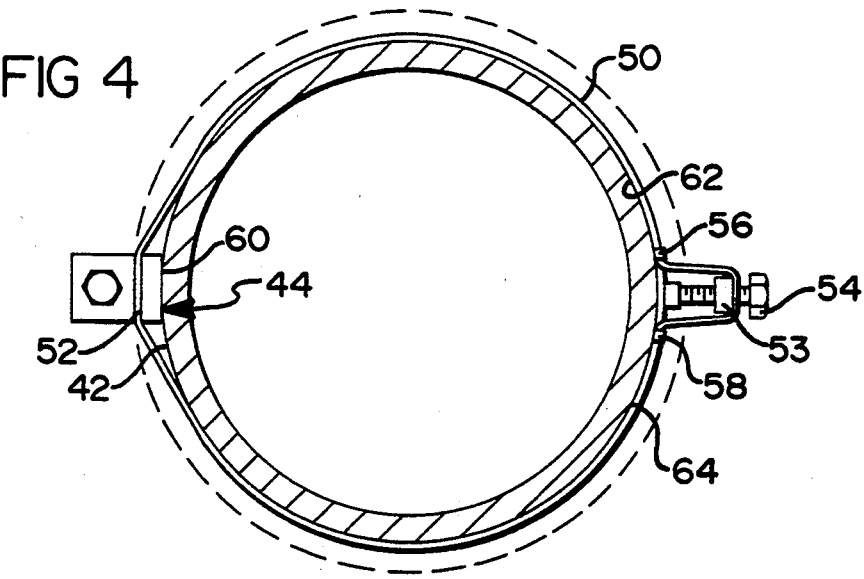
FIG. 4 is a fragmentary sectional view taken along the line 4—4 of FIG. 2 looking in the direction of the arrows.

Referring now to FIG. 1, the down lighting system 10 of the present invention is shown in association with a ceiling 12 in an elevator cab 14 which has two walls thereof broken away for clarity.

The elevator cab 14 has a control panel 16 and floor indicator lights 18 of a known kind, as well as a pair of sliding doors 20. The interior space 22 of the elevator cab 14 is illuminated by a plurality of main (sometimes called a primary source of illumination) light fixtures 24 one of which 26 provides main and emergency lighting (sometimes called a secondary source of illumination).

As shown in FIG. 2, each of the main light fixtures 24 (and 26) are supported on the ceiling 12 at access holes 28 therein.

More particularly, each of the main light fixtures 24 (and 26) includes a housing 30 having a closed end 32 and a flanged open end 34 joined respectively to an intermediate tubular portion 35.

The flanged open end 34 has an outer diameter 36a which overlies the access hole 28 and which further defines a retention surface 36 that engages the outer surface 38 of the ceiling 12 to lock the housing 30 against further inboard movement with respect to the ceiling 12.

In accordance with certain principles of my invention, the housing 30 is held in place on the ceiling 12 by a retainer assembly 40 of a form that can be adjustably positioned along its vertical surface 42 so as to enable the housing 30 to be universally adapted for mounting on a number of different ceiling thicknesses as will be discussed. The retainer assembly 40 more particularly includes a single L shaped retainer 44 with a lower leg that is connected to the inner surface 46 of ceiling 12 by a single fastener 48, representatively shown as a screw element. The upper leg of the L shaped retainer 44 is in close proximity to the access hole 28 and extends vertically upwardly of the surface 42. Consequently, it is positioned to engage a diametric point 52 on the outer surface 42 of the housing 30 as shown in FIG. 4.

The retainer assembly 40 also includes an annular clamp 50 which wraps around the full circumference of the outer surface 42 and against the outboard surface 52 of the upper leg of the L shaped retainer 44. It includes a tensioning nut 53 which is positioned to be drawn outwardly by a screw element 54 so as to draw end segments 56, 58 of the annular clamp together. As the clamp is tightened, the inboard surface 60 of the upper leg 44 is forced against the outer surface 42. Simultaneously, the clamp 50 applies hoop pressure between the inner surface 62 of the annular clamp 50 and the diametrically opposite surface segment 64 of the outer surface 42 of the housing 30 as shown in FIG. 4. Retainer assembly 40 is thereby readily adjustable along different points on the height of the outer surface 42 of the housing 30 so as to be adjustable to different height or thickness ceilings 12. Consequently, the housing 30 is a universal housing suitable for a wide range of different ceiling applications. Furthermore, the arrangement enables such a universal housing configuration to be firmly clamped between the retention surface 36 and the retainer assembly 40 so that the assembled main light fixture 24 will not rotate with respect to the ceiling 12 during bulb replacement and following connection of a wiring system thereto such that the finally assembled fixture and bulbs mounted thereon will withstand dynamic test conditions for elevator operation without damage or dislodgement from the ceiling 12.

The arrangement enables individual fixtures to be quickly assembled and placed on the ceiling 12. Furthermore, the retainer assembly 40 is of low cost while providing a desired structural integrity between the main light fixture 24 and the ceiling 12.

A further feature of the main lamp fixture 24 is that it can be located in low clearance plenum spaces such as illustrated by reference numeral 66 in FIG. 1. More particularly, the housing 30 is configured so that only a reduced plenum height clearance is required to accommodate a high efficiency lamp source such as the halogen lamp assembly 70 of fixture 24. The halogen lamp assembly 70 is shown mounted in a socket 72 connected to the closed end 32 of the main light fixture 24.

More particularly, the conduit fitting 80 has a threaded end 74 thereon which is threadably received in an internally threaded bore 76 through the closed end 32. The threaded end 74 is locked to the outer surface of the closed end by a lock nut 78. The conduit fitting 80 has the opposite end thereof secured by a clamp assembly 82 to one end of a flexible conduit 84. The conduit 84 has wires 86, 88 directed therethrough to supply 12 volt power to the power contacts on the socket 72.

Thus, the flexible conduit 84 is connected to the lamp housing 30 so that wiring thereto will not be separated or dislodged during elevator operation or replacement of bulbs in the fixture 24. In areas where electrical code does not require wire protection, the conduit 84 and conduit fitting 80 may be deleted. Further, the socket 72 may be mounted as shown in FIG. 2 or mounted on the top surface of closed end 32.

The socket 72 has a double contact bayonet connector into which the base 90 of the halogen lamp assembly 70 can be inserted and rotated to locate the retention pins 92 thereof in place and complete the electrical contact of the filament 94 of a halogen bulb 96 to the wires 86, 88. The halogen lamp assembly 70 further includes a reflector 98 that will focus the light from the filament 94 in a downward direction through the open end of the housing 30. The reflector 98 includes a bright inner surface 100 and has a spun over end 102 that captures a protective lens 104 which is secured on the end of the reflector 98 to keep the inner surface 100 clean. The lens 104 also prevents broken bulb fragments from falling into the elevator to meet protection requirements for down lighting systems of the type used in elevators.

The housing 30 has a plurality of air cooling holes 106 formed in the closed end 32 as shown in FIG. 3. The closed end also includes holes 108 to receive screws 110 for holding the mounting flange 112 of the socket 72 in place on the closed end 32.

In a preferred embodiment, the housing 30 can be a single piece casting to define a strong base for the fixture 24. The flanged open end 34 can be machined on the retention surface 36 and on the circumferential surface 36a and outer surface 36b for a finished appearance. The inside surface 114 of the housing 30 can be machined smooth to provide a polished appearance or, alternatively, as illustrated, it can be threaded through a segment 116 thereof to provide light rings for a diffused appearance when looking up into the cavity of the housing 30.

The closed end 32, in the illustrated arrangement, has six ventilating holes 106, which are provided to keep the bulb temperature within desired operating levels. In the illustrated arrangement, holes are configured to provide suitable ventilation for a 20 watt halogen bulb 96.

The closed end 32 has a large central hole 76 machined therein for the bulb socket 72. The socket bracket 112 can be either screwed or riveted in place. The resultant structure provides a strong, movement resistant base into which bulbs can be changed without popping out the socket. The inside diameter of housing 30 is large enough to provide for easy replacement of the halogen lamp assembly 70 into and out of the closed end 32. Furthermore, the wires for the main light fixture 24 exit out the end wall 32 for connection to a suitable power supply.

The central hole 76 can be threaded if flexible conduit is desired to cooperate with the lock nut 78 to securely fasten the conduit fitting 80 in place to further provide a strong base which will not vibrate loose during elevator operation and which will enable bulbs to be connected and disconnected without affecting the wire connection to the socket 72.

Figure 5:
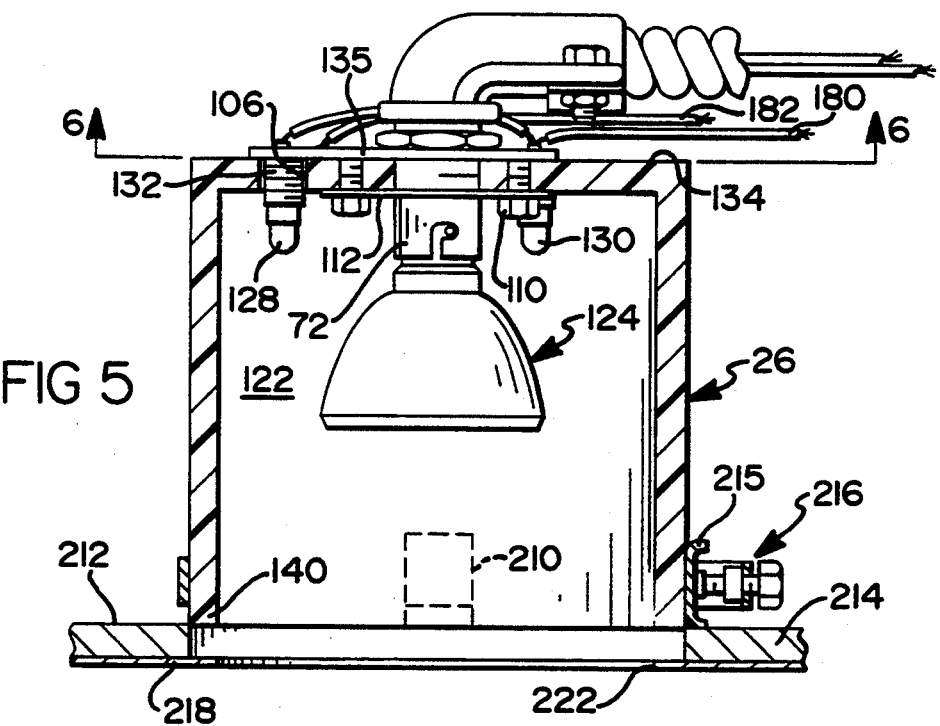
FIG. 5 is a diagrammatic view of an emergency lighting fixture in accordance with the present invention.

A further aspect of the present invention is illustrated in FIG. 5, which shows a combined fixture 26 for main and emergency lighting. The combined fixture 26 is essentially the same as the lamp fixture 24 in FIG. 2 but with the addition of an emergency bulb and socket assembly 120 formed in a side space 122 around a halogen lamp assembly 124.

Figure 6:
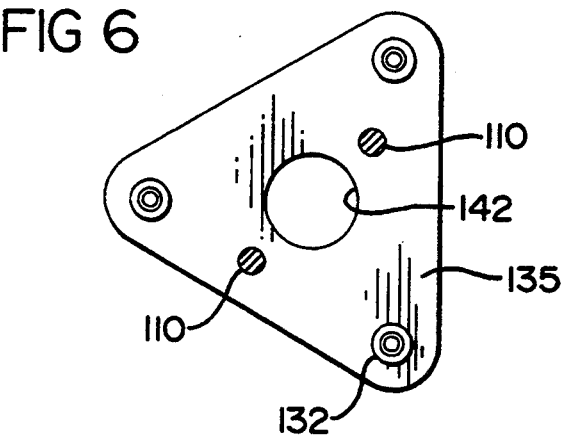
FIG. 6 is a sectional view of an emergency bulb and socket assembly taken along the line 6—6 of FIG. 5.

A combined fixture 26 is mountable in ceiling 12 through access opening 28 therein in the same manner as discussed with reference to the lighting unit 24. In the illustrated arrangement, the only difference is the addition of two (or more) dedicated emergency light bulbs 126, 128, 130 which have sockets 132 fixed to a mounting plate 135. The mounting plate 135 is fixed to the outer surface 134 of the closed end of the fixture by means of two screws 110 that are used for holding the mounting flange 112 of the socket 72 for the halogen bulb. The emergency bulbs 126, 128, 130 are thus located in two of the vent holes 106 and allows the lens end 138 of bulbs 128, 130 to direct light energy downwardly through the open end 140 of the fixture 26. FIG. 6 shows the mounting plate 135 with three sockets 132 and an opening 142 for the socket 72.

Figure 7:
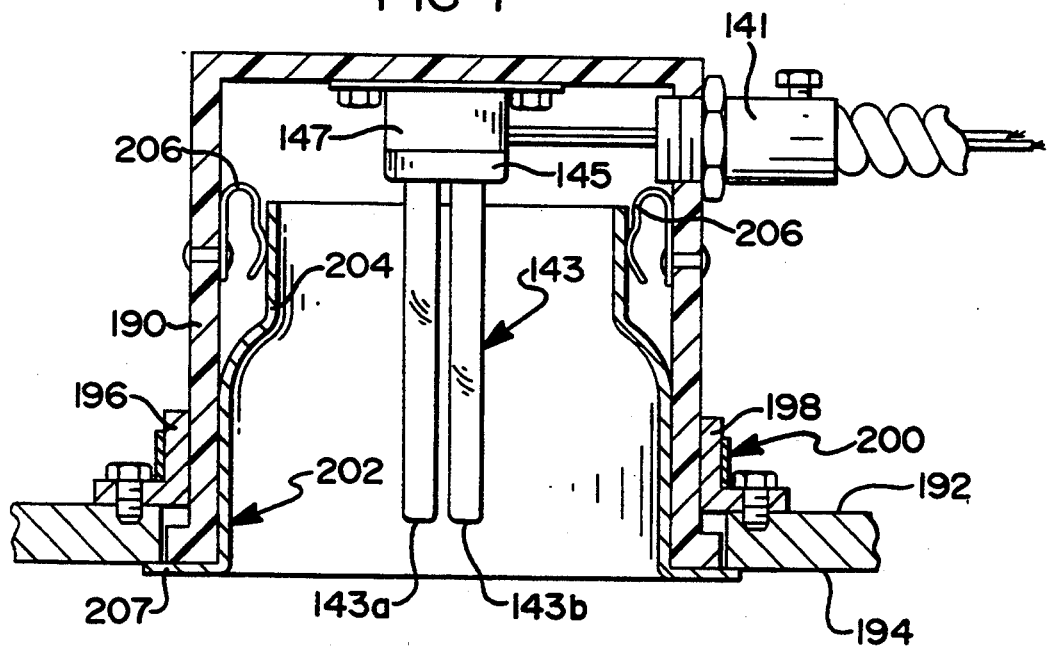
FIG. 7 is another embodiment of the light fixture of the present invention.

FIG. 7 shows another embodiment of the invention in which the fixture housing remains the same but has a side conduit fitting 141. In this embodiment, the primary light source is a single ended fluorescent bulb 143 having its base 145 connected to a socket 147 in the closed end of a fixture housing corresponding to those previously discussed. The bulb 143 is shown as a dual unit (quad units could also be used) which has two ends 143a, 143b for directing down lighting through the open end of the fixture. An advantage of the embodiment is provided by a reduced lateral dimension which results in more space for an emergency bulb and socket assembly of the type shown at 120 in FIG. 5.

FIG. 7 illustrates an alternative mounting arrangement which locates a housing 190 on the inner surface 192 of a ceiling 194. The housing 190 is stabilized by two diametrically spaced L-brackets 196, 198 which are clamped to the housing 190 by a clamp 200 of the same configuration as clamp 50 in the FIG. 2 embodiment. Another feature of this mounting configuration is that it enables a trim bezel 202 to be inserted in the open end of housing 190 to provide a thin, finished exterior appearance. The trim bezel 202 has a small diameter tubular extension 204 held in place in the interior of the housing 190 by a plurality of spaced spring clips 206. This arrangement reduces the light aperture for aesthetic reasons and provides a flange 207 for covering the ceiling hole. It also enables the bezel to be removed for replacing the bulb.

FIG. 5 shows a third mounting arrangement. In this case, the open end 140 of the housing is clamped by diametrically spaced brackets 210 (one shown in dotted line) that are fastened by suitable means to the inner surface 212 of the ceiling 214. The reaction plate 215 of a clamp 216 also engages the inner surface 212 and forms a third point for stabilizing the fixtures 26 on top of the ceiling 214. The ceiling 214 has a thin metal sheet 218 which has an edge that extends beyond a centerline 220 in the ceiling 214 to shield the open end 208. The sheet 218 has a hole 222 forming a light aperture for the fixture 26.

Figure 8:
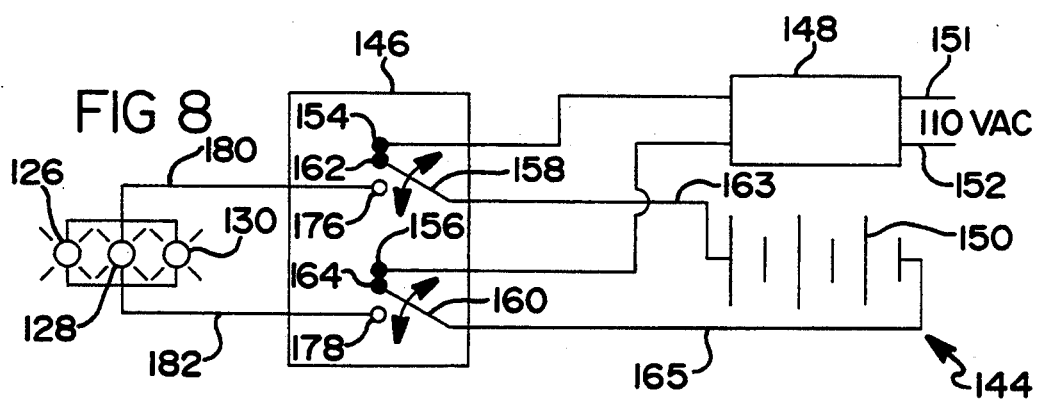
FIG. 8 is a diagrammatic view of an emergency lighting circuit and controller in accordance with my invention.

As shown in FIG. 8, the emergency light portion of fixture 26 is associated with an emergency lighting circuit 144. The emergency lighting circuit 144 includes a double pole, double throw relay 146 that selectively connects a battery charger 148 to either charge a gel cell (or cadmium nickel), rechargeable, direct current battery 150 or to connect the battery 150 to the emergency light bulbs 128, 130.

Figure 8A:
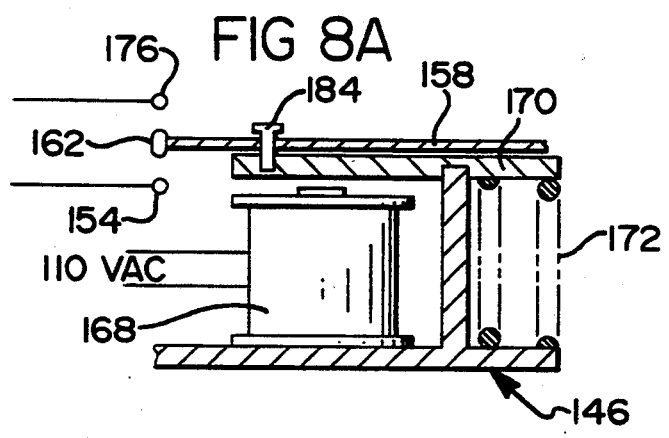
FIG. 8A is a diagrammatic view of a relay coil.

More particularly, the battery charger 148 has its input terminals connected to wires 150, 152 of a 110 volt power supply. The output terminals are connected to contacts 154, 156 which are electrically connected (by means of movable contact carriers 158, 160 when a coil 168 is energized) to contacts 162,164 connected to conductors 163, 165, respectively for providing a charging circuit between the anode and cathode terminals of the battery 150. The charging circuit is controlled by relay coil 168 (FIG. 8A) that is connected across the 110 volt power supply to displace an armature 170 in a direction to close the contacts 154, 156. In cases where the 110 volt supply fails, the coil 168 is deenergized and the armature is returned by a spring 172 in a direction to open the contacts 158, 160 and to close normally open contacts 176, 178. The normally open contacts 176, 178, when closed, complete an emergency lighting circuit from the conductors 163,165 through conductors 180, 182 to opposite sides of the emergency light bulbs 128, 130.

A feature of the present invention is that the armature 170 is directly connected to a test button 184 which can be pulled to overcome the force of the coil 168 and directly open the contacts 154, 156 to complete the battery lighting circuit across the lamps 126, 128, 130 during periods when the main power is on and when it is desired to test the emergency lighting.

Combined fixture 26 can be mounted on the ceiling 12 in a location with respect to an emergency test point represented by reference numeral 199 in FIG. 1. The test point is located one foot from the wall of the elevator with the control panel 16 and four feet from the floor 13. In order to meet test point candle power requirements, combined light fixture 26 is located on the ceiling closely adjacent and vertically above the test point 199. It has been found that the dedicated bulbs 126, 128 and 130 each having lens ends 138 thereon in fixture 26 provide sufficient illumination at the test point 200 to meet emergency candle power requirements in a space 22 when the main power has failed.

The provision of dedicated bulbs for emergency lighting in a common main lighting fixture housing enables the emergency lighting to be provided in the down lighting system without requiring extra fixture or lens costs. The dedicated bulbs are used on a standby basis and are not used for normal illumination and, therefore, are not subject to burn out. When the main power fails, all emergency lights are connected to the battery source and are concentrated in one spot directly over the test point. They are arranged to illuminate the test point in an unobstructed manner without requiring that the emergency light bend around baffles or other obstructions heretofore used to partially conceal emergency light bulb configurations.

Both the illuminating and emergency bulbs can be changed in the combination light fixture 26 without removing lenses or removing ceiling segments or use of a ladder.

If desired, a test switch could be placed in series with the relay coil and the test switch could be operated to simulate a power failure to see if the emergency lighting is standby ready. However, the installation of the pull rod on the armature accomplishes the same objective but is less expensive than a separate switch.

Figure 9:
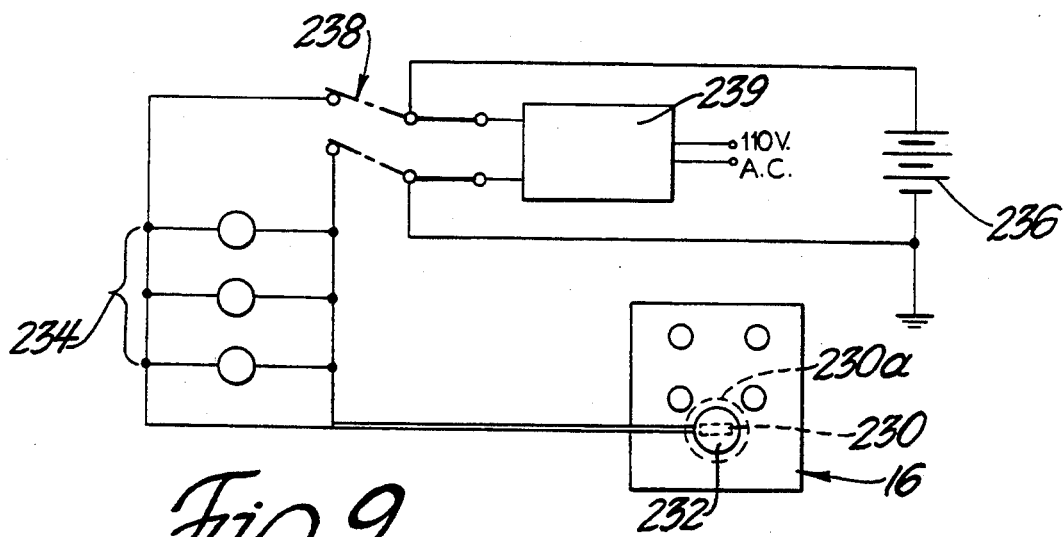
FIG. 9 is a schematic view of an emergency lighting circuit including another embodiment of the invention.

As described above, emergency lights with three lens end bulbs provide a limited low level illumination for lighting an emergency push button on the control panel 16. In order to enhance the emergency lighting arrangement in the embodiment of FIG. 9 a light emitting diode (LED) 230 is located on the control panel 16 behind an alarm button 232 to illuminate when power failure occurs. To accomplish this purpose, the LED 230 is connected in parallel with three emergency lights 234 that are selectively connected to an emergency battery 236 by a control relay 238 corresponding to relay 146 in FIG. 8. During normal operation the 110 volt supply is connected by the control relay 238 to a charger 239 for charging the emergency battery 236. Thus, when there is a 110 volt power supply failure, the LED will illuminate the alarm button 232. If desired, the LED can be of the blinking or flashing type to attract more attention than a constantly illuminated emergency push button. Alternatively, the LED can be replaced by a passive phosphorescent ring 230a shown in dotted line in FIG. 9. The ring 230a is made from a known phosphorescent material such as halophosphated phosphors, strontium phosphors and radium. Such materials produce light when exposed to normal lighting conditions and continue to glow in the dark following excitation. In this case, on failure of the 110 volt supply, the elevator is dark. The passive ring 230a will glow to illuminate the alarm button 232.

Figure 10:
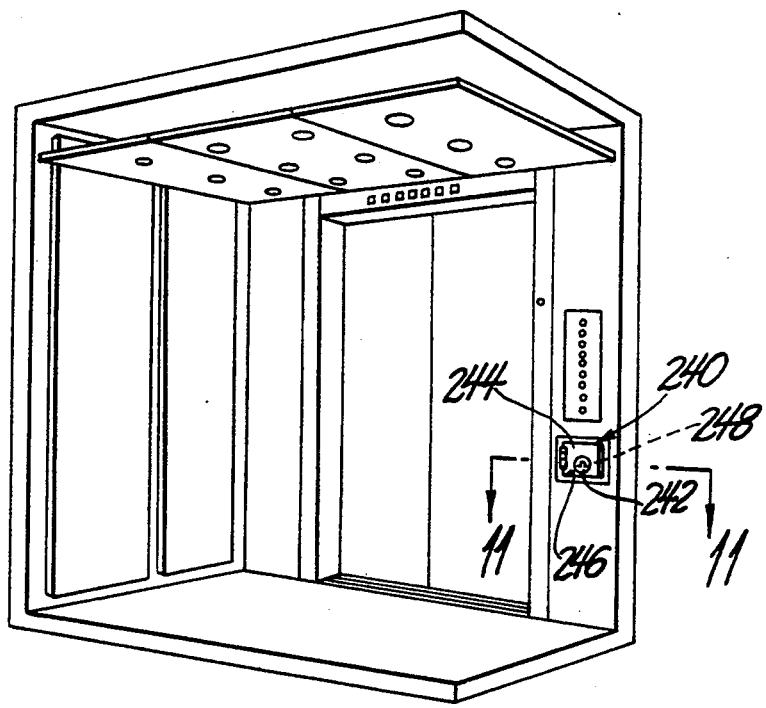
FIG. 10 is a diagrammatic view of still another embodiment of the invention.

Another embodiment of the invention is shown in FIG. 10 which illustrates a typical telephone box 240. The telephone box 240 has an indicator button 242 on its face with a universal symbol of a telephone. The box 240 has a door 244 for covering an access opening 246 to a telephone which is directly wired to a emergency service. In the past such arrangements have exposed the telephone to vandalism or theft. In accordance with the present invention the button 242 is illuminated by an LED 248 wired in parallel with the LED of FIG. 9. Such light source on the emergency cab telephone cover can be located behind or in an indicator button located on or in the vicinity of the telephone access door 244. In cases where the emergency phone is replaced by a speaker phone the illumination source can be located in the button 244 which is operable to automatically dial the phone or push it to directly talk without dialing.

Figure 11:
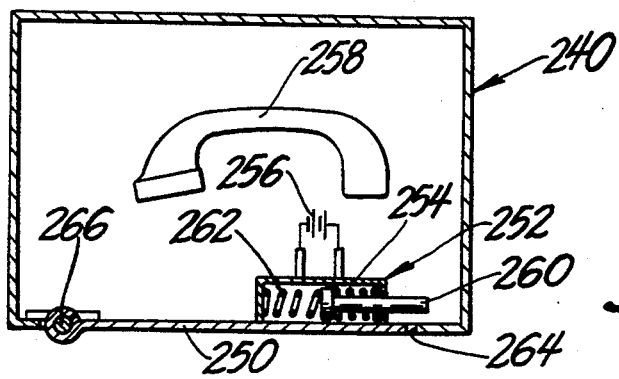
FIG. 11 is an enlarged sectional view taken along the line 10—10 of FIG. 11.
Figure 12:
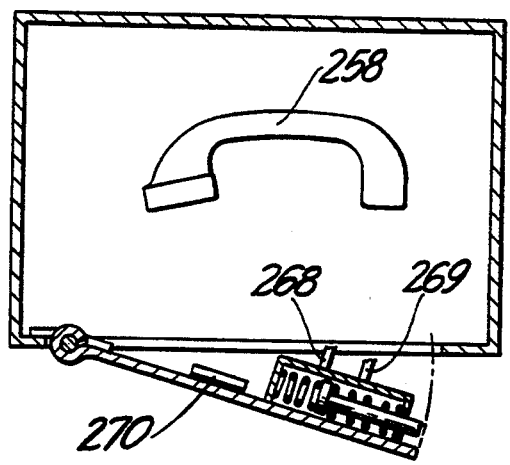
FIG. 12 is an enlarged sectional view like FIG. 11 showing an access door in its open position.

The embodiment of FIGS. 11 and 12 represent a still further enhancement of the invention shown in FIG. 10. One problem with telephone emergency calling systems is that the telephone is readily accessible and is thereby subject to theft or vandalism. In accordance with the embodiment of FIGS. 11 and 12, an emergency system is provided which is simpler and less expensive than speaker phone systems which are often used in place of standard cab phones to prevent access to the telephone. The improved system of this invention enables a standard cab phone to be located in the elevator behind a selectively opened access door 250. The improved system includes a locking latch 252 which is maintained normally locked when the main power is functioning. Under emergency conditions the solenoid 254 for the locking latch 252 is energized by the emergency D.C. power source 256 to release the access door so as to expose a phone handset 258. As shown in FIG. 11, a plunger 260 of the locking latch 252 is spring loaded by a spring 262 to lock against the backside of a side door jamb 264 to prevent the door 250 from being pivoted open about a side hinge 266. In FIG. 12, emergency power is connected by the emergency relay across the wires 268, 269 to energize the solenoid 254 to overcome the force of spring 262 so as to retract the plunger 260 to clear the jamb and thereby allow outward swinging movement of the door 250 about the hinge 266. Once the door 250 is opened the phone is accessible for communicating the emergency. As in the previous embodiment a flashing LED 270 can be provided on the door 250 to call attention to the location of the door 250 for opening it once the plunger is retracted as shown in FIG. 12.

An emergency light also can be provided within the phone compartment. It illuminates when the emergency power source is connected so as to draw an occupant's attention to the phone. If desired the emergency light can be of the flashing variety to provide still further attention.

Figure 13:
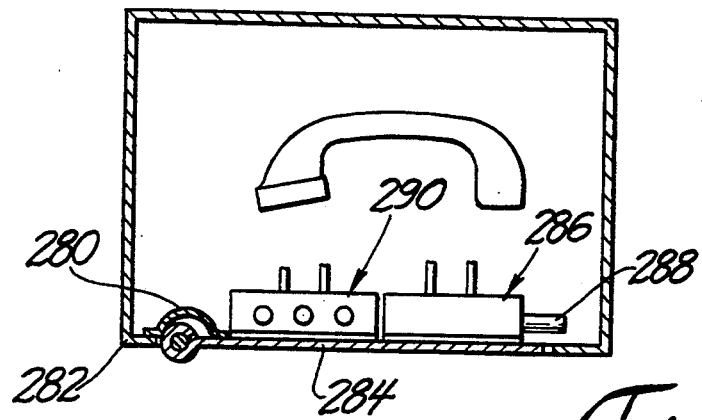
FIG. 13 is an enlarged sectional view like FIG. 11 showing another embodiment of the invention.
Figure 14:
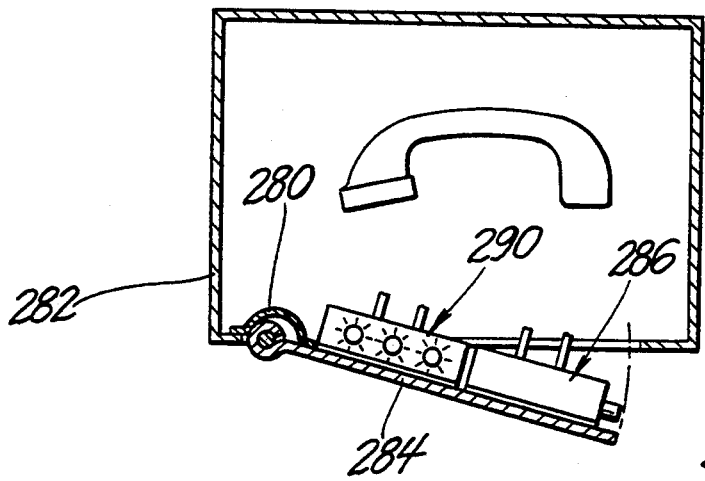
FIG. 14 is a view like FIG. 13 showing an access door in its open position.

In the embodiment of FIGS. 13 and 14 a spring 280 is added between the phone box 282 and a door 284 for swinging the door 284 open when the emergency circuit is operative to energize a solenoid locking latch 286 corresponding to latch 252 in FIGS. 11 and 12. When energized, latch 286 has its plunger 288 retracted so as to clear the door jamb. In this embodiment, the elevator cab phone lighting includes three emergency lights 290 on the access door so as to concurrently aid in identifying and locating the emergency phone while providing a low level illumination of the elevator under emergency conditions. As in the embodiment of FIG. 8, the three lights 290 are connected to the emergency battery power source when the relay connects the battery power thereto while disconnecting the charging circuit from the battery when the 110 volt power source failure occurs.

Figure 15:
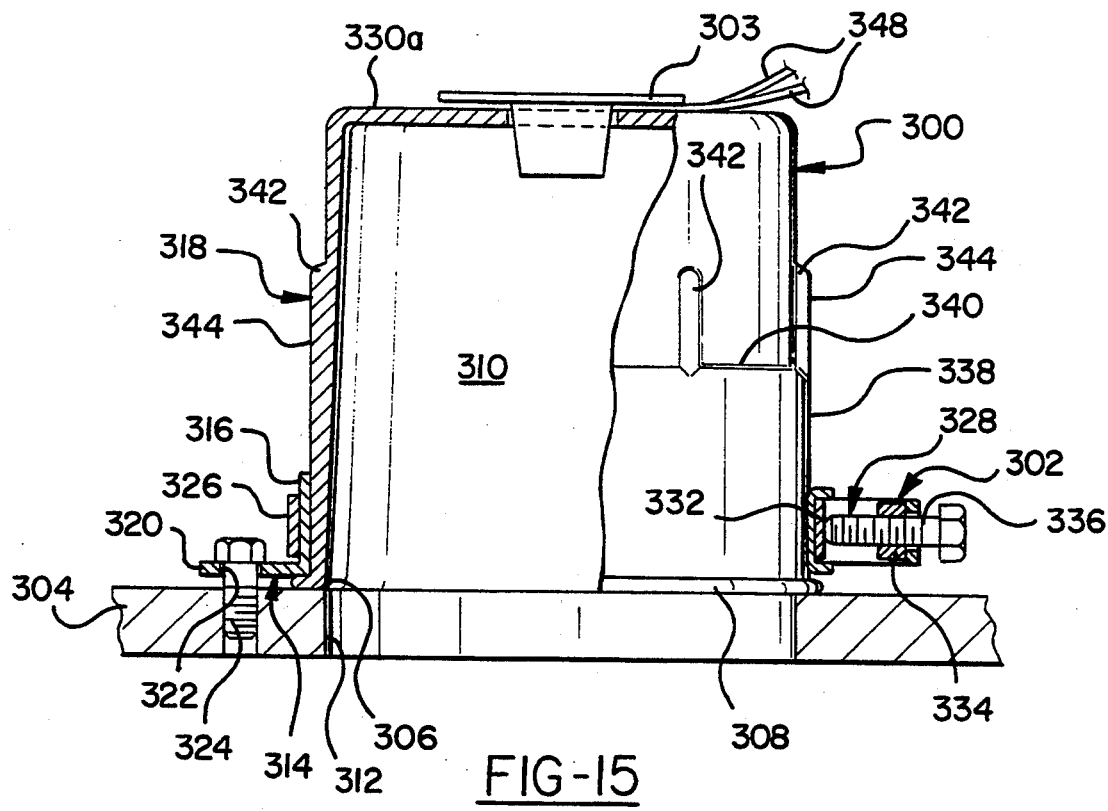
FIG. 15 is a sectional view of another light fixture embodiment.
Figure 16:
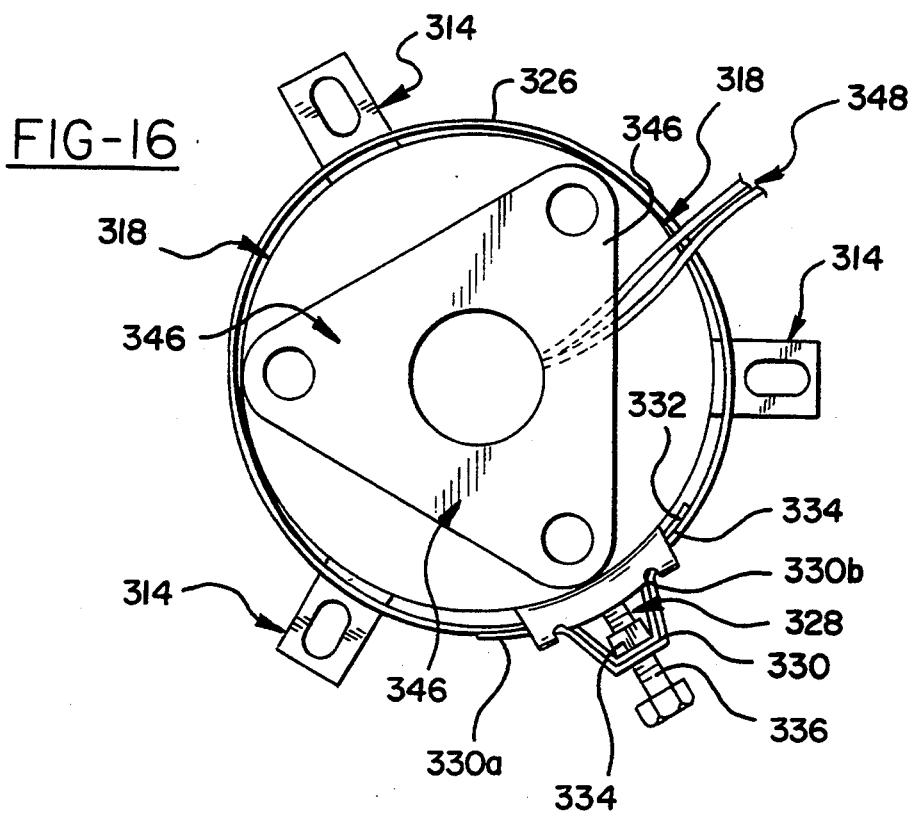
FIG. 16 is a top elevational view of FIG. 15.

FIGS. 15 and 16 illustrated another embodiment of the present invention wherein a lamp housing 300 and fixture mounting assembly 302 is configured to provide for a stable mounting of the lamp housing 300 on top of a ceiling 304. The lamp housing 300 has an open end 306 with a radially outwardly extending annular flange 308. The annular flange 308 defines the entrance to a cavity 310 within the lamp housing 300 for mounting a lamp on a socket mounting end 301 of the housing 300. The lamp can be one or a plurality of lamps as shown in the previously described embodiment of the invention. The lamp is supported on a socket bracket 303 for illuminating an elevator cab or the like through a lighting hole 312 formed through the ceiling 304. The annular flange 308 is seated on top of the ceiling 304 in surrounding relationship to the lighting hole 312.

In accordance with the present invention the fixture mounting assembly 302 includes three L-shaped retainer members 314 each having an upper leg 316 extending vertically of the outer surface 318 of the lamp housing 300. Each of the L-shaped retainer members 314 also include a lower leg 320 that is directed radially outwardly of the lamp housing 300 at equidistantly spaced points around the circumference thereof. Each lower leg 320 has a hole 322 therein through which a suitable fastener such as a screw 324 extends to be threadably connected to the ceiling 304 at the upper surface thereof. The upper legs 320 are pressed against the outer surface 318 by an annular clamp 326 engaged with each of the upper legs 320 so as to force each of the upper legs 320 into engagement with the outer surface 318. An adjustment means 328 is connected to the annular clamp 326 and is operative for tightening and loosening the annular clamp 326 so as to allow it to be vertically adjusted with respect to the outer surface 318 for accommodating different thickness ceilings. The adjustment means 328, more particularly, includes a U-shaped bracket 330 having a first end 330b connected to a free end 332 of the annular clamp 326 and having a second end 330b connected to a fixed end 334 of the annular clamp 326. The U-shaped bracket 330 carries a nut 334 through which a screw 336 is directed to press against the free end 332. When the screw 336 is tightened it will force the U-shaped bracket outwardly of the lamp housing 300 so as to draw the free end 332 against the lamp housing 300. As shown in FIG. 16, this causes the inside surface of the annular clamp 326 to apply a hoop force against annular segments of the outer surface 318. When the screw 336 is loosened, the hoop force is released permitting the fixture mounting assembly 302 to be adjusted vertically with respect to the outer surface 318.

Another aspect of the present invention is that the outer surface 318 has a constant diameter annular outer surface 338 that extends approximately one half the height of the housing 300 to thereby extend part way from the open end toward the socket mounting end. The annular outer surface 338 has an upper ledge surface 340 thereon. The housing 300 has a plurality of ribs 342 integrally formed therein that extend upwardly from the upper ledge surface 340. Each of the ribs 342 is equidistantly spaced from an adjacent rib and each of the ribs 342 has an outer surface 344 thereon. If the ceiling is thicker the annular clamp 326 will extend around the outer surfaces 344 of the ribs. The provision of the extension ribs 342 enables the housing 300 to be a single one piece casting using less material while enabling one housing to be adapted for use with the same fixture mounting assembly 302 on a wide range of ceiling heights. The outer surfaces 344 of each of the ribs 342 are located within a common cylinder having a diameter that corresponds to the outer diameter of the annular outer surface 338. The housing 300 in addition to being a single unitary casting has ribs 342 formed integrally thereof.

The aforedescribed fixture mounting assembly 302 thereby is configured to define a stable three point platform that will locate the lamp housing 300 on top of the ceiling 304 in a manner that will prevent tilting with respect to the lighting hole 312 such that a lamp or lamps supported thereon will remain vertically disposed so that the projected illumination will be properly directed downwardly into the interior of the elevator cab.

Another aspect of the present invention is that the socket plate 303 is secured to the upper surface 300a of the lamp housing 300 at three stake segments 346 thereof. The socket plate 303 is thereby mounted to define a precision location of connection of a lamp socket within the housing 300. Furthermore, the plate 303 is associated with wire leads 348 that are pressed between the underside of the plate 303 and the upper surface 330a such that a connection between the light socket 348 and the wire leads is isolated from strain when the wire leads 348 are connected to other wiring that connects the lamp housing 300 to a suitable power source.

Figure 17:
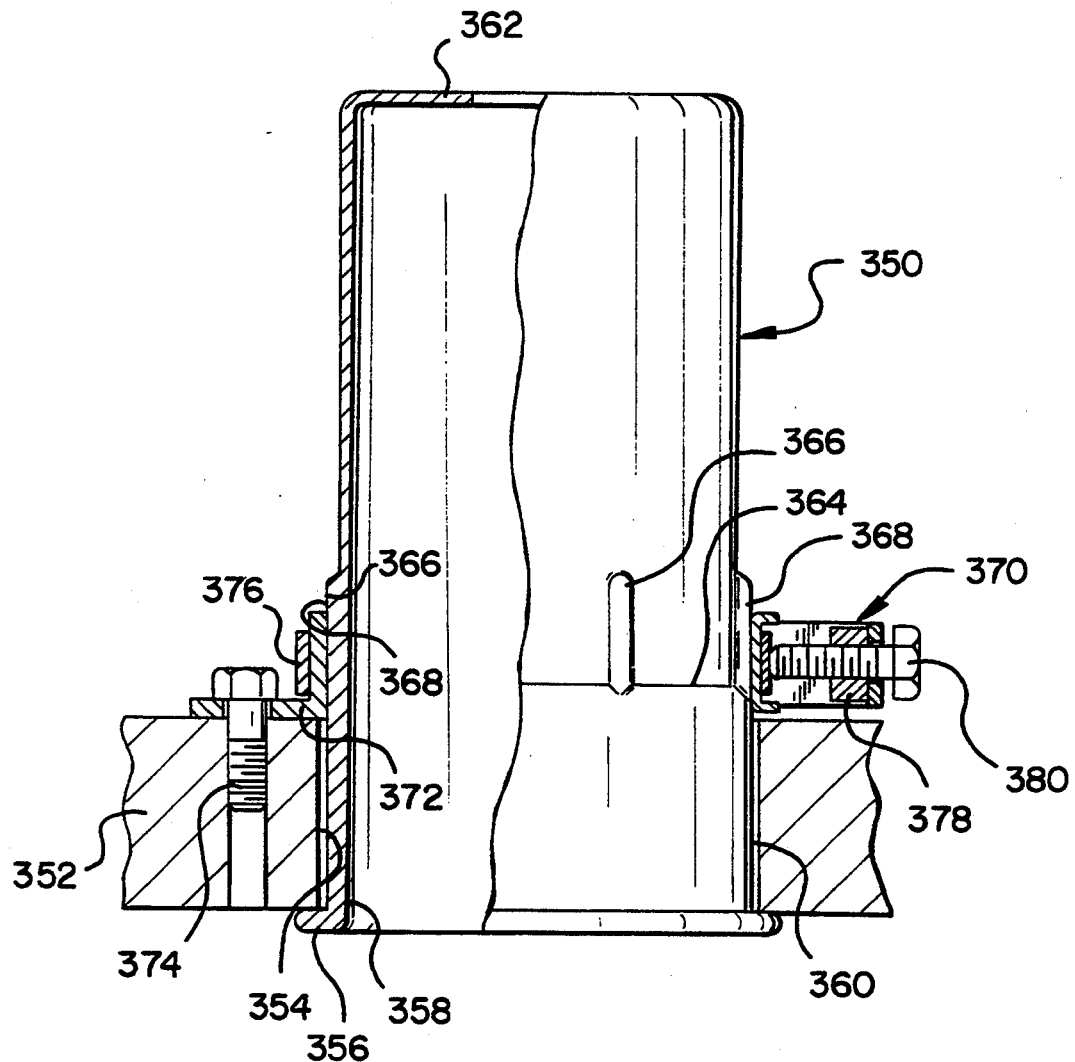
FIG. 17 is a sectional view of another light fixture embodiment.

FIG. 17 illustrates still another embodiment of the invention wherein a lamp housing 350 is mounted in a ceiling 352 through a lighting hole 354 therein. In this embodiment the lamp housing 350 has a flanged end 356 located on the inner surface of the ceiling 352 at an open end 358 of the housing 350. The housing 350 has a first annular outer surface 360 that extends part way from the open end 358 toward a socket mounting end 362. The first annular outer surface 360 includes an upper ledge surface 364 thereon. The housing 350 has a plurality of ribs 366 extending upwardly from said upper ledge surface 364. Each of the ribs 366 has an outer surface 368 located in the same cylinder as the first annular outer surface 360 such that they will define a surface extension to adapt the housing 350 for use in ceilings having the thickness of the ceiling 352 in FIG. 17 or having lesser thicknesses. In the case of the illustrated thickness an annular clamp means 370 is engageable with the outer surfaces 368 of the ribs 366 and in the case of a lesser thickness ceiling the clamp means will engage the annular outer surface 360 for securing the housing 350 in place within the ceiling. The clamp means 370 is like that shown in the embodiment of FIG. 2 including a L-shaped retainer 372 that is fastened by a screw 374 to the ceiling 352 and further including an annular clamp 376 that is adjustably secured to the outer surface of the housing 350, either at the ribs 366 as shown in FIG. 17 or at the outer surface 360 if the ceiling is of a lesser thickness. The annular clamp 376 is positioned by an adjustment nut 378 and a screw 380 as previously described with respect to the embodiment of FIG. 2. The clamp means 370 thereby is separable from the annular outer surface 360 and engageable with the outer surface 368 of each of the ribs 366 for securing the housing on a ceilings of different thickness.

What is claimed is:

1. A ceiling mount fixture for an elevator cab comprising a housing having an open end and a closed end, a flange on said open end for fixedly securing said housing to ceilings having different thicknesses, and a down lighting source within said housing having socket means connected to said closed end and a bulb directing down lighting through said open end;

a retainer member extending vertically from the inner surface of the ceiling in close spaced parallelism with said outer surface of the housing;

a retainer clamp surrounding said outer surface of the housing, said retainer clamp engaged with said retainer member and including a screw operative to force said retainer clamp against said retainer member into locking engagement with said outer surface of the housing while directing a hoop force on the housing which is radially opposed to the force on said retainer member.

2. In the ceiling mount fixture of claim 1, said down lighting bulb including a halogen bulb, a light reflector surrounding said halogen bulb to direct light from said halogen bulb vertically downwardly through said housing and a safety glass cover connected to said reflector to diffuse light from said halogen bulb while serving to prevent broken bulb fragments from dropping through said open end.

3. In the ceiling mount fixture of claim 1, said down lighting source including a fluorescent bulb having a first end directing down lighting through said open end and further having a terminal end connected to said socket.

4. A ceiling mount fixture for mounting an illuminating source on different thickness ceilings with lighting holes comprising:

a housing including an outer surface, and a closed end;

said open end adapted to be mounted with respect to the ceiling in alignment with a lighting hole through the ceiling, said ceiling having an inner surface;

a retainer member extending vertically from the inner surface of the ceiling immediately adjacent the lighting hole and in close spaced parallelism with said outer surface of the housing;

a retainer clamp surrounding said outer surface of the housing when aligned with the lighting opening, said retainer clamp engaged with said retainer member and including a screw operative to force said retainer hoop against said retainer member into locking engagement with said outer surface of the housing while directing a hoop force on the housing which is radially opposed to the force on said retainer member;

a socket in said housing; and a conduit connected to the closed end of said housing to provide for connection of wires to said socket.

5. In the ceiling mount fixture of claim 4, said closed end including a socket hole for accessing a light socket through the closed end into the interior of said housing; a socket mounting plate bridging said opening and a fastener for securing said socket mounting plate to said closed end so as to fixedly secure said light socket thereon.

6. In the ceiling mount fixture of claim 4, said housing having a height to width ratio in the range of 1 to 1 and said retainer member and said retainer clamp being adjustably locatable anywhere along the height of said outer surface of said housing extending above said inner surface of said ceiling.

7. In the ceiling mount fixture of claim 6, said retainer member being an L bracket with a short leg and a long leg; said short leg connected to said inner surface of the ceiling and said long leg extending vertically from said short leg closely adjacent the lighting hole through the ceiling; and a fastener securing said short leg to said inner surface of the ceiling.

8. A ceiling mount fixture for mounting on different thickness ceilings having an inner surface and an outer surface and for connection to a flexible conduit type wire system comprising:

a housing including an outer surface, a flanged open end and a closed end; a locating flange on said flanged open end adapted to overlie the ceiling on said outer surface thereof to cover an access hole through the ceiling and having a diameter in excess of that of said housing to permit insertion of the housing through the hole and said flanged open end having a retention surface engageable with the outer surface of the ceiling when said housing is mounted on the ceiling;

a retainer member extending vertically from the inner surface of the ceiling immediately adjacent the ceiling access hole and in close spaced parallelism with said outer surface of the housing;

a retainer clamp surrounding said outer surface of the housing when said housing is inserted through the access hole and engaged with the retainer member and including a screw operative to force the retainer member into locking engagement with said outer surface of the housing while directing a hoop force on the housing which is radially opposed to the force of the retainer member;

a socket located inboard of said housing; and a conduit connected to the closed end of said housing including a low profile conduit fitting that provides for connection of wires to said socket.

9. In the ceiling mount fixture of claim 8, said closed end including a socket hole for accessing said light socket through the closed end into the interior of said housing; a socket mounting plate bridging said opening and a fastener for connecting said socket mounting plate to said closed end so as to fixedly secure said light socket thereon.

10. In the ceiling mount fixture of claim 8, said housing having a height to width ratio in the range of 1 to 1 and said retainer member and retainer clamp being adjustably locatable anywhere along the height of said outer surface of said housing extending above the inner surface of different thickness ceilings having a height varying between the height of the fixture minus the thickness of said locating flange and the thickness of said retainer clamp.

11. In the ceiling mount fixture of claim 10, a plurality of said retainer members, each of said retainer members being an L-bracket with a short leg connected to the inner surface of the ceiling and a long leg extending vertically from said short leg closely adjacent the access hole through the ceiling; and a single mechanical fastener securing said short leg to the inner surface of the ceiling.

12. In the ceiling mount fixture of claim 4, a primary light connected in said socket, said primary light including a halogen bulb, a light reflector surrounding said halogen bulb to direct the light from said halogen bulb vertically downwardly through said housing and a safety glass cover to diffuse light from the halogen bulb while serving to prevent fragments from a broken halogen bulb from dropping through the open end of said housing.

13. In a lighting system having a primary lighting means and an emergency lighting means and a test point for measuring the emergency lighting means when primary lighting means has failed the improvement comprising:
a main power supply;
the test point located below the ceiling and to one side of a vertical wall disposed below the ceiling;
a dual light source located in said ceiling vertically above the test point; said dual light source including a common fixture housing supported on said overhead ceiling and having an open end directly exposed to the test point;
said dual light source including a first lamp in said common fixture housing, said first lamp being a halogen bulb; a reflector for said halogen bulb arranged to direct light energy from said halogen bulb into the space surrounding the test point when a regular power supply is energized; and
said dual light source further including a second lamp in said common fixture housing including a lens and a battery for energizing said second lamp only when said main power supply fails whereby said second lamp directs light energy on the test point to an illumination level sufficient to meet minimum emergency lighting standards.

14. In a down lighting system for an elevator having a ceiling with an outer surface and an access hole therein;
a housing including an open end and a closed end;
a primary source of illumination including a main power supply and a secondary source of illumination including an emergency power supply having a battery;
said open end having a flange thereon of a diameter in excess of that of said housing to permit insertion of the housing through said access hole and defining a retention surface engageable with the ceiling when the fixture is mounted thereon to interlock the fixture at the outer surface of the ceiling;
a first socket connected inboard of the housing for connecting said first primary source of illumination to said housing; and
a second socket connected inboard of the housing at a point offset from a vertical axis through said first socket for connecting said secondary source of illumination to said housing and to said battery in said emergency power supply for directing emergency lighting from the open end of said housing so as to provide an emergency source of illumination in the space below said ceiling during periods when the primary source of illumination is inoperative.

15. In the ceiling mount fixture of claim 14, said primary source of illumination including a primary light connected in said first socket, said primary light including a halogen bulb, a light reflector surrounding said halogen bulb to direct the light from said halogen bulb vertically downwardly through said housing and a safety glass cover to diffuse light from the halogen bulb while serving to prevent fragments from a broken halogen bulb from dropping through the open end of said fixture.

16. In the ceiling mount fixture of claim 15, said second socket being located on one side of the interior surface of said housing, said reflector being located within said housing, and a bulb having a lens thereon; said bulb connected in said second socket for directing light downwardly between said halogen bulb and said housing for lighting the space below said under emergency lighting conditions.

17. In the ceiling mount fixture of claim 14, a single ended fluorescent bulb connected to said first socket, said single ended fluorescent bulb having a reduced lateral width compared to the width of said housing to provide a wide annular light aperture between said single ended fluorescent bulb and the inner surface of said housing.

18. A ceiling mount fixture for mounting a light on different thickness ceilings having a lighting hole therethrough comprising:
a housing including an outer surface, an open end and a socket carrying end;
said open end adapted to be mounted on top of the ceiling in alignment with the lighting hole therein;
a first L-shaped retainer having an upper leg extending vertically upwardly from the ceiling immediately adjacent the lighting hole and in close spaced parallelism with said outer surface of the housing;
said first L-shaped retainer having a lower leg extending radially outwardly of said open end and adapted to be connected by a fastener to the ceiling;
an annular clamp surrounding said outer surface of the housing; said annular clamp engaged with said upper leg of said retainer and including an adjustment screw operative to force said upper leg into engagement with said outer surface of said housing while directing a hoop force on said outer surface of said housing opposed to the force of said upper leg on said outer surface of said housing;
and said adjustment screw operative for loosening said annular clamp so as to allow said annular clamp to be vertically adjustable with respect to said outer surface for accommodating different thickness ceilings.

19. The ceiling mount fixture of claim 18, further comprising second and third L-shaped retainers located equidistantly from each other and from said first L-shaped retainer and having upper legs thereof held between said outer surface of said housing and said annular clamp and further having lower legs extending radially outwardly of said open end and adapted to be connected by a fastener to the ceiling and said first, second and third L-shaped retainers thereby defining a three point support for mounting said housing on top of the ceiling.

20. The ceiling mount fixture of claim 19, further comprising said screw located diametrically opposite said first L-shaped retainer.

21. A ceiling mount fixture for mounting a light on different thickness ceiling at lighting holes therethrough comprising:
   a housing including an open end and a socket mounting end;
   said housing having a first annular outer surface extending part way from said open end toward said socket mounting end and including a upper ledge surface thereon;
   said housing having a second annular outer surface of a diameter less than said first annular outer surface extending from said upper ledge surface; a plurality of ribs extending radially outwardly of said second annular surface and upwardly from said upper ledge surface; each of said ribs having an outer surface thereon; and
   a retainer clamp surrounding said outer surface of the housing when aligned with the lighting opening, said retainer clamp engageable with either said first annular outer surface or said outer surfaces of said ribs: said retainer clamp including a screw operative to force said retainer clamp into locking engagement with either said first annular outer surface or said outer surfaces of said ribs depending upon the location of said retainer clamp vertically on said housing;
   said retainer clamp engageable with a portion of said first annular outer surface for securing said housing on a ceiling having a first thickness;
   said retainer clamp separable from said portion of said first annular outer surface and engageable with said outer surface of each of said ribs for securing said housing on a ceiling having a thickness that extends the top of the ceiling above said upper ledge surface.

22. The ceiling mount fixture of claim 21, further comprising said housing having a radially outwardly extending flange at said open end that extends radially outwardly of said first annular outer surface and radially outwardly of said outer surface of each of said ribs.

23. The ceiling mount fixture of claim 21, further comprising said outer surfaces of each of said ribs being located within a common cylinder having a diameter that corresponds to the diameter of said first annular outer surface.

24. The ceiling mount fixture of claim 22 further comprising said outer surfaces of each of said ribs being located within a common cylinder having a diameter that corresponds to the diameter of said first annular outer surface.

25. The ceiling mount fixture of claim 24, further comprising said housing being a single unitary casting having said first annular outer surface and said ribs formed integrally thereof.

26. The lamp housing of claim 21, further comprising a socket mounting plate; a socket on said socket mounting plate having lead wires connected thereto; means for staking said socket mounting plate to said housing and said lead wires press fit between said socket mounting plate and said housing for eliminating strain at the connection of said lead wires at said socket.

27. The lamp housing of claim 21, further comprising a socket mounting plate; a socket on said socket mounting plate having lead wires connected thereto; means for staking said socket mounting plate to said housing and said lead wires press fit between said socket mounting plate and said housing for eliminating strain at the connection of said lead wires to said socket.

28. A ceiling mount fixture for mounting a light on different thickness ceiling at lighting holes therethrough comprising:
   a housing including an open end and a socket mounting end;
   said housing having a first annular outer surface extending part way from said open end toward said socket mounting end and including a upper ledge surface thereon;
   said housing having a plurality of ribs extending upwardly from said upper ledge surface; each of said ribs having an outer surface thereon; and
   an annular clamp engageable with a portion of said first annular outer surface for securing said housing on a ceiling having a first thickness;
   said annular clamp separable from said portion of said first annular outer surface and engageable with said outer surface of each of said ribs for securing said housing on a ceiling having a thickness that extends the top of the ceiling above said upper ledge surface; said housing having a radially outwardly extending flange at said open end that extends radially outwardly of said first annular outer surface and radially outwardly of said outer surface of each of said ribs.

29. A ceiling mount fixture for mounting an illuminating device on different thickness ceilings at light access holes therein and for connection to a flexible conduit type wire system comprising:
   a housing including an inner surface, an open end, a closed end and a tubular portion therebetween;
   said open end having a diameter in excess of said tubular portion to permit insertion of the housing through the access hole and defining a retention surface engageable with the outer surface of the ceiling when the fixture is mounted on the ceiling to provide interlocked engagement between the ceiling and the housing at the outer surface of the ceiling;
   light sockets;
   a wire connected to the closed end of the housing including a low profile conduit fitting that provides for connection of said wire to said light sockets;
   a first primary source of illumination including a primary power supply and a secondary source of illumination including an emergency power supply separate from said primary power supply;
   said light sockets including a first socket connected inboard of said housing for connecting said first primary source of illumination to said wire for directing primary illumination to a space below said ceiling; and
   said light sockets including a second socket connected inboard of said housing at a point offset from a vertical axis through said first socket for connecting said secondary source of illumination to said emergency power supply for providing emergency lighting from the open end of said housing so as to provide an emergency source of illumination in the space below said ceiling because of primary power supply failure; said primary source of illumination including a primary light connected in said first socket, said primary light including a halogen bulb, a light reflector surrounding said halogen bulb to direct the light from said halogen bulb vertically downwardly through said housing and a safety glass cover to diffuse light from the halogen bulb while serving to prevent fragments from a broken halogen bulb from dropping through the open end of said housing; said second socket being located on one side of said inner surface of said housing, said reflector being located concentrically of said inner surface of said housing, and a lamp in said second socket having a lens thereon for directing light downwardly through the offset space in said housing between said halogen bulb and said housing for lighting the space below the ceiling light fixture under emergency lighting conditions.

* * * * *